US012771251B2

(12) United States Patent
Nam et al.

(10) Patent No.: US 12,771,251 B2
(45) Date of Patent: Oct. 20, 2026

(54) POWER VOLTAGE GENERATOR AND DISPLAY DEVICE HAVING THE SAME

(71) Applicant: Samsung Display Co., LTD., Yongin-si (KR)

(72) Inventors: Yanguk Nam, Yongin-si (KR); Sungchun Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/364,290

(22) Filed: Oct. 21, 2025

(65) Prior Publication Data

US 2026/0045877 A1 Feb. 12, 2026

Related U.S. Application Data

(63) Continuation of application No. 18/629,361, filed on Apr. 8, 2024, now Pat. No. 12,470,143, which is a continuation of application No. 18/199,067, filed on May 18, 2023, now Pat. No. 11,962,241.

(30) Foreign Application Priority Data

Sep. 28, 2022 (KR) ........................ 10-2022-0123044

(51) Int. Cl.
*H02M 3/158* (2006.01)
*G09G 3/20* (2006.01)

(52) U.S. Cl.
CPC .......... *H02M 3/158* (2013.01); *G09G 3/2096* (2013.01); *G09G 2330/021* (2013.01); *G09G 2330/028* (2013.01)

(58) Field of Classification Search
None
See application file for complete search history.

(56) References Cited

U.S. PATENT DOCUMENTS 5,410,466 A 4/1995 Maehara
8,581,519 B2 11/2013 Kwong et al.
11,069,309 B2 7/2021 Sultenfuss et al.
(Continued)

FOREIGN PATENT DOCUMENTS

JP 2021121143 A 8/2021
KR 1020160130222 A 11/2016
KR 20180078871 A 7/2018

*Primary Examiner* — Matthew Yeung
(74) *Attorney, Agent, or Firm* — CANTOR COLBURN LLP

(57) ABSTRACT

A power voltage generator includes: an input voltage providing part outputting input voltage based on a first signal; an inductor receiving the input voltage to generate an inductor current and connected to an outputting part; the outputting part generating an output voltage based on the inductor current and generating a feedback voltage; an output sensing part sensing the output voltage based on a second signal and generating an output sensing voltage; a peak voltage generator generating a peak voltage based on the input voltage, set data corresponding to an output set voltage, and ripple data corresponding to a ripple set voltage; a first comparing part generating a stop signal based on the output sensing and peak voltages; a second comparing part generating a start signal based on the set data and feedback voltage; and a switch controller generating the first and second signals based on the start and stop signals.

20 Claims, 8 Drawing Sheets

(56) References Cited

U.S. PATENT DOCUMENTS

| | | | | |
|---|---|---|---|---|
| 2007/0262757 | A1 | 11/2007 | Kawagoshi | |
| 2010/0007282 | A1* | 1/2010 | Yamamoto | G09G 3/22 315/169.1 |
| 2010/0007651 | A1 | 1/2010 | Kim | |
| 2010/0019749 | A1 | 1/2010 | Katsuya et al. | |
| 2011/0062932 | A1 | 3/2011 | Hawkes | |
| 2014/0139498 | A1 | 5/2014 | Hussain et al. | |
| 2014/0139499 | A1 | 5/2014 | Hussain et al. | |
| 2014/0247295 | A1 | 9/2014 | Hussain et al. | |
| 2015/0161949 | A1* | 6/2015 | Wang | G09G 3/3406 315/307 |
| 2015/0311778 | A1 | 10/2015 | Chang et al. | |
| 2016/0189613 | A1 | 6/2016 | Kim et al. | |
| 2017/0012531 | A1 | 1/2017 | Calhoun et al. | |
| 2017/0236488 | A1 | 8/2017 | Suzuki | |
| 2020/0111439 | A1 | 4/2020 | Kim et al. | |
| 2023/0396163 | A1* | 12/2023 | Wei | H02M 1/0003 |
| 2024/0013692 | A1 | 1/2024 | Ryu et al. | |

* cited by examiner

FIG. 5

| VR_DATA | VR |
|---|---|
| 1 | 2mV |
| 2 | 4mV |
| 3 | 6mV |
| 4 | 8mV |
| 5 | 10mV |
| 6 | 12mV |
| 7 | 14mV |
| 8 | 16mV |
| 9 | 18mV |
| 10 | 20mV |
| 11 | 22mV |
| 12 | 24mV |
| 13 | 26mV |
| 14 | 28mV |
| 15 | 30mV |

FIG. 6

| | MATERIAL | VR with flicker reconginzed | VR(ELVDD) |
|---|---|---|---|
| MODEL1 | A | 20mV | 10mV |
| MODEL2 | B | 30mV | 14mV |
| MODEL3 | C | 40mV | 20mV |

FIG. 7

| | VR(ELVDD) |
|---|---|
| AOD | 10mV |
| NORMAL | 20mV |
| HBM | 30mV |

FIG. 10

| RESOLUTION | VR(VDD1/VDD2) |
|---|---|
| 2560X1440 | 10mV |
| 1920X1080 | 20mV |
| 1280X720 | 30mV |

FIG. 11

| FREQUENCY | VR(VDD1/VDD2) |
|---|---|
| 120HZ | 10mV |
| 60HZ | 20mV |
| 30HZ | 30mV |

POWER VOLTAGE GENERATOR AND DISPLAY DEVICE HAVING THE SAME

This application is a continuation of U.S. patent application Ser. No. 18/629,361, filed on Apr. 8, 2024, which is a continuation of U.S. patent application Ser. No. 18/199,067, filed on May 18, 2023, now Issued U.S. Pat. No. 11,962,241, issued on Apr. 16, 2024, which claims priority to Korean Patent Application No. 10-2022-0123044, filed on Sep. 28, 2022, and all the benefits accruing therefrom under 35 U.S.C. § 119, the content of which in its entirety is herein incorporated by reference.

BACKGROUND

1. Field

Embodiments of the present invention relate to a power voltage generator and a display device having the power voltage generator. More particularly, embodiments of the present invention relate to a power voltage generator varying an output voltage and a display device having the power voltage generator.

2. Description of the Related Art

Generally, a display device may include a display panel, a timing controller, a gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

The display device may further include a power voltage generator that generates a power voltage for driving the pixels and a driving voltage for driving the data driver, the gate driver, and/or the timing controller.

When the power voltage generator generates the power voltage and the driving voltage, switching loss and conduction loss may occur. In particular, the switching loss may increase as a switching frequency of the power voltage and the driving voltage increases.

SUMMARY

Embodiments of the present invention provide a power voltage generator varying an output voltage.

Embodiments of the present invention also provide a display device having a power voltage generator.

According to embodiments of the present invention, a power voltage generator includes: an input voltage providing part configured to output an input voltage in response to a first switch control signal, an inductor configured to receive the input voltage to generate an inductor current and connected to an outputting part, the outputting part configured to generate an output voltage based on the inductor current and to generate a feedback voltage corresponding to the output voltage, an output sensing part configured to sense the output voltage in response to a second switch control signal and to generate an output sensing voltage, a peak voltage generator configured to generate a peak voltage based on the input voltage, set data corresponding to an output set voltage, and ripple data corresponding to a ripple set voltage, a first comparing part configured to generate a stop signal based on the output sensing voltage and the peak voltage, a second comparing part configured to generate a start signal based on the set data and the feedback voltage, and a switch controller configured to generate the first switch control signal and the second switch control signal based on the start signal and the stop signal.

In an embodiment, the input voltage providing part may include: a first transistor including a control electrode configured to receive the first switch control signal, a first electrode configured to receive the input voltage, and a second electrode connected to a first node, the first node being connected to a first electrode of the inductor; and a second transistor including a control electrode configured to receive the first switch control signal, a first electrode connected to the first node, and a second electrode connected to a ground, and the first transistor may be a different type from the second transistor.

In an embodiment, the outputting part may include: a first capacitor including a first electrode connected to a second node and a second electrode connected to a ground, where the second node is connected to a second electrode of the inductor; a first resistance element including a first electrode connected to the second node and a second electrode configured to output the feedback voltage, and a second resistance element including a first electrode connected to the second electrode of the first resistance element and a second electrode connected to the ground, and the output voltage may be a voltage of the second node.

In an embodiment, the output sensing part may include: a third transistor including a control electrode configured to receive the second switch control signal, a first electrode connected to a second node, and a second electrode connected to a third node, where the second node is connected to a second electrode of the inductor; a fourth transistor including a control electrode configured to receive the second switch control signal, a first electrode connected to the third node, and a second electrode connected to a ground; and a second capacitor including a first electrode connected to the third node and a second electrode connected to the ground, and the third transistor may be of a different type from the fourth transistor, and the third transistor may be a different type from the fourth transistor.

In an embodiment, the first comparing part may include a comparator including a first input terminal connected to the third node, a second input terminal configured to receive the peak voltage, and an output terminal configured to output the stop signal.

In an embodiment, the second comparing part may include an analog-to-digital converter configured to convert the set data into an analog form, and a second comparator including a first input terminal configured to receive the set data converted to the analog form, a second input terminal configured to receive the feedback voltage, and an output terminal configured to output the start signal.

In an embodiment, the peak voltage may increase as the output set voltage increases, increases as the ripple set voltage increases, and decrease as the input voltage increases.

In an embodiment, the outputting part may include: a first capacitor including a first electrode connected to a second node and a second electrode connected to a ground, where the second node is connected to a second electrode of the inductor; a first resistance element including a first electrode connected to the second node and a second electrode configured to output the feedback voltage; and a second resistance element including a first electrode connected to the second electrode of the first resistance element and a second electrode connected to the ground. The output sensing part may include a third transistor including a control electrode configured to receive the second switch control signal, a first electrode connected to the second node, and a second electrode connected to a third node, a fourth transistor including a control electrode configured to receive the second switch control signal, a first electrode connected to the third node, and a second electrode connected to the ground, and a second capacitor including a first electrode connected to the third node and a second electrode connected to the ground, and the peak voltage may increase as a capacitance of the first capacitor increases, and decreases as a capacitance of the second capacitor increases.

In an embodiment, the first comparing part may be configured to output the stop signal having an activation level to the switch controller when the output sensing voltage reaches the peak voltage, and the switch controller may be configured to convert the first switch control signal and the second switch control signal from the activation level to an inactivation level when the switch controller receives the stop signal having the activation level.

In an embodiment, the second comparing part may be configured to convert the set data into an analog form, and to output the start signal having an activation level to the switch controller when the feedback voltage is smaller than the set data converted into the analog form, and the switch controller is configured to convert the first switch control signal to the activation level when the switch controller receives the start signal having the activation level.

In an embodiment, the output voltage may be greater than or equal to the output set voltage and less than or equal to a sum of the output set voltage and the ripple set voltage.

In an embodiment, a switching frequency of the output voltage may decrease as the ripple set voltage increases.

According to embodiments of the present invention, a display device includes: a display panel including pixels, a gate driver configured to provide gate voltages to the pixels, a data driver configured to provide data voltages to the pixels, a timing controller configured to control the gate driver and the data driver, and a power voltage generator configured to provide a power voltage for driving the pixels to the display panel, the power voltage generator may include an input voltage providing part configured to output an input voltage in response to a first switch control signal, an inductor configured to receive the input voltage to generate an inductor current and connected to an outputting part, the outputting part configured to generate the power voltage based on the inductor current and to generate a feedback voltage corresponding to the power voltage, an output sensing part configured to sense the power voltage in response to a second switch control signal and to generate an output sensing voltage, a peak voltage generator configured to generate a peak voltage based on the input voltage, set data corresponding to an output set voltage, and ripple data corresponding to a ripple set voltage, a first comparing part configured to generate a stop signal based on the output sensing voltage and the peak voltage, a second comparing part configured to generate a start signal based on the set data and the feedback voltage, and a switch controller configured to generate the first switch control signal and the second switch control signal based on the start signal and the stop signal.

In an embodiment, the timing controller may be configured to provide the ripple data to the power voltage generator.

In an embodiment, the ripple set voltage may be variable according to a model of the display panel.

In an embodiment, the ripple set voltage in a low power mode may be smaller than the ripple set voltage in a high power mode.

In an embodiment, the power voltage generator may be configured to apply the power voltage to the display panel through a power line and to sense a power current applied to the power line, and the ripple set voltage may decrease as the power current decreases.

According to embodiments of the present invention, a display device includes: a display panel including pixels, a gate driver configured to provide gate voltages to the pixels, a data driver configured to provide data voltages to the pixels, a timing controller configured to control the gate driver and the data driver, and a power voltage generator configured to provide a driving voltage for driving the data driver to the data driver, the power voltage generator may include an input voltage providing part configured to output an input voltage in response to a first switch control signal, an inductor configured to receive the input voltage to generate an inductor current and connected to an outputting part, the outputting part configured to generate the driving voltage based on the inductor current and to generate a feedback voltage corresponding to the driving voltage, an output sensing part configured to sense the driving voltage in response to a second switch control signal and to generate an output sensing voltage, a peak voltage generator configured to generate a peak voltage based on the input voltage, set data corresponding to an output set voltage, and ripple data corresponding to a ripple set voltage, a first comparing part configured to generate a stop signal based on the output sensing voltage and the peak voltage, a second comparing part configured to generate a start signal based on the set data and the feedback voltage, and a switch controller configured to generate the first switch control signal and the second switch control signal based on the start signal and the stop signal.

In an embodiment, the ripple set voltage may decrease as a resolution of the display panel increases.

In an embodiment, the ripple set voltage may decrease as a driving frequency of the display panel increases.

Therefore, the power voltage generator may vary a ripple of an output voltage by including an input voltage providing part configured to output an input voltage in response to a first switch control signal, an inductor configured to receive the input voltage to generate an inductor current and connected to an outputting part, the outputting part configured to generate the output voltage based on the inductor current and to generate a feedback voltage corresponding to the output voltage, an output sensing part configured to sense the output voltage in response to a second switch control signal and to generate an output sensing voltage, a peak voltage generator configured to generate a peak voltage based on the input voltage, set data corresponding to an output set voltage, and ripple data corresponding to a ripple set voltage, a first comparing part configured to generate a stop signal based on the output sensing voltage and the peak voltage, a second comparing part configured to generate a start signal based on the set data and the feedback voltage, and a switch controller configured to generate the first switch control signal and the second switch control signal based on the start signal and the stop signal.

In addition, the display device may decrease a switching frequency of an output voltage by increasing a ripple voltage of the output voltage of the power voltage generator. Accordingly, the display device may reduce switching loss of the power voltage generator.

However, the effects of the present invention are not limited to the above-described effects, and may be variously expanded without departing from the spirit and scope of the present invention.

BRIEF DESCRIPTION OF THE DRAWINGS

FIG. 5 is a table illustrating an example of ripple data of the display device of FIG. 1.

FIG. 6 is a table illustrating an example of a ripple set voltage for a power voltage of the display device of FIG. 1.

FIG. 7 is a table illustrating an example of a ripple set voltage for a power voltage of a display device according to embodiments of the present invention.

FIG. 10 is a graph illustrating an example of a ripple set voltage for first and second driving voltages of a display device according to embodiments of the present invention.

FIG. 11 is a graph illustrating an example of a ripple set voltage for first and second driving voltages of a display device according to embodiments of the present invention.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
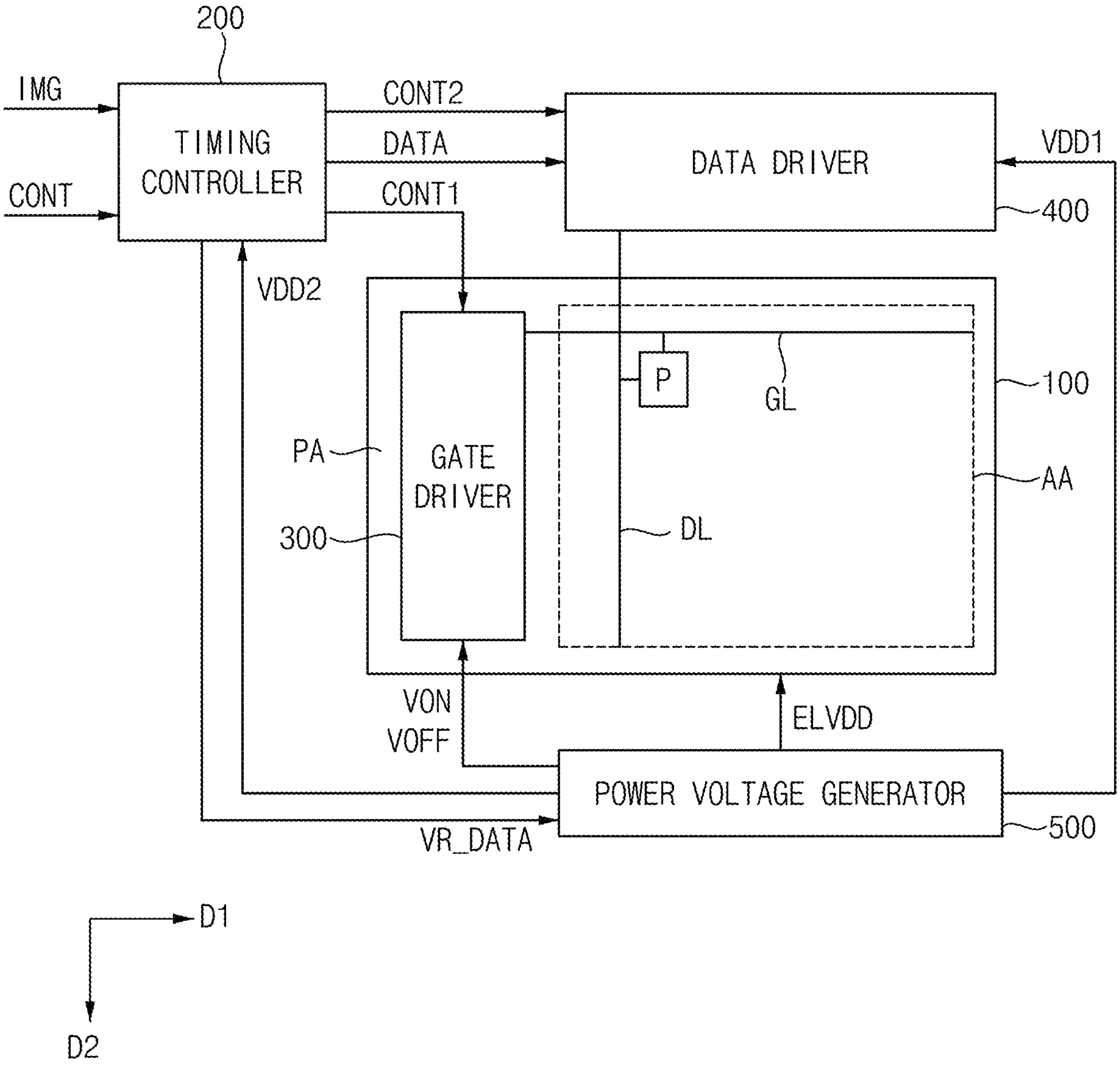
FIG. 1 is a block diagram illustrating a display device according to embodiments of the present invention.

FIG. 1 is a block diagram illustrating a display device according to embodiments of the present invention.

Referring to FIG. 1, the display device may include a display panel 100, a timing controller 200, a gate driver 300, a data driver 400, and a power voltage generator 500. In an embodiment, the timing controller 200 and the data driver 400 may be integrated into one chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit; "GPU"). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The timing controller 200 may generate ripple data VR_DATA corresponding to a ripple set voltage and output the ripple data VR_DATA to the power voltage generator 500. For example, the timing controller 200 may output the ripple data VR_DATA to the power voltage generator 500 through an inter-integrated circuit ("I2C") communication or a single wire ("SWIRE") communication.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type. The data driver 400 may output the data voltages to the data lines DL.

The power voltage generator 500 may receive the ripple data VR_DATA from the timing controller 200. The power voltage generator 500 may generate voltages to drive the pixels P, the timing controller 200, the gate driver 300, and the data driver 400 based on the ripple data VR_DATA. For example, the power voltage generator 500 may be a power management integrated circuit ("PMIC").

For example, the power voltage generator 500 may generate the power voltage ELVDD for driving the pixels P and output the generated power voltage ELVDD to the display panel 100.

For example, the power voltage generator 500 may generate gate driving voltages VON and VOFF for driving the gate driver 300 and output them to the gate driver 300. The gate driving voltages VON and VOFF may include a gate-on voltage VON indicating a high level of the gate signal and a gate-off voltage VOFF indicating a low level of the gate signal.

For example, the power voltage generator 500 may generate a first driving voltage VDD1 for driving the data driver 400 and output the first driving voltage VDD1 to the data driver 400.

For example, the power voltage generator 500 may generate a second driving voltage VDD2 for driving the timing controller 200 and output the second driving voltage VDD2 to the timing controller 200.

Figure 2:
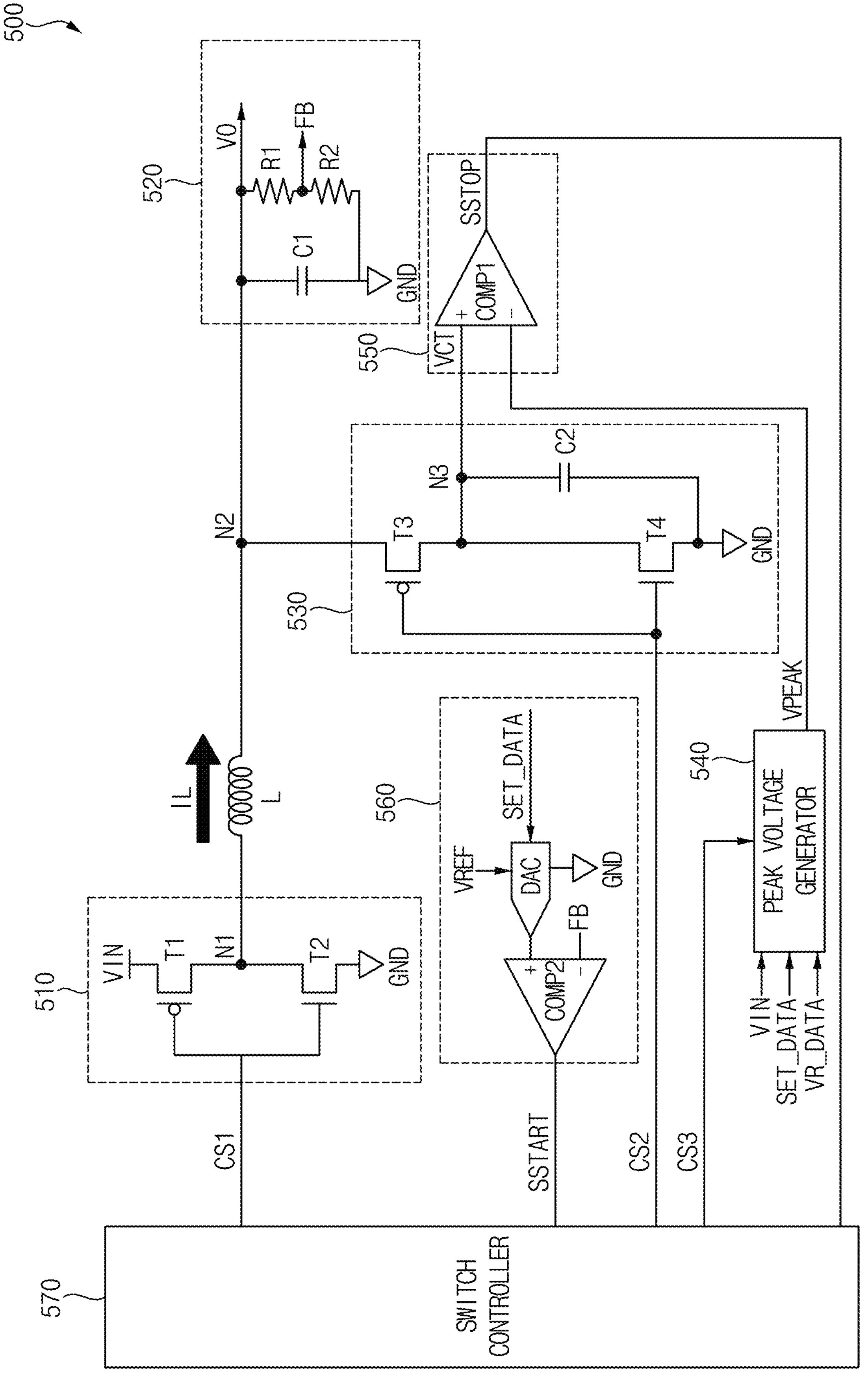
FIG. 2 is a circuit diagram illustrating an example of a power voltage generator of the display device of FIG. 1.
Figure 3:
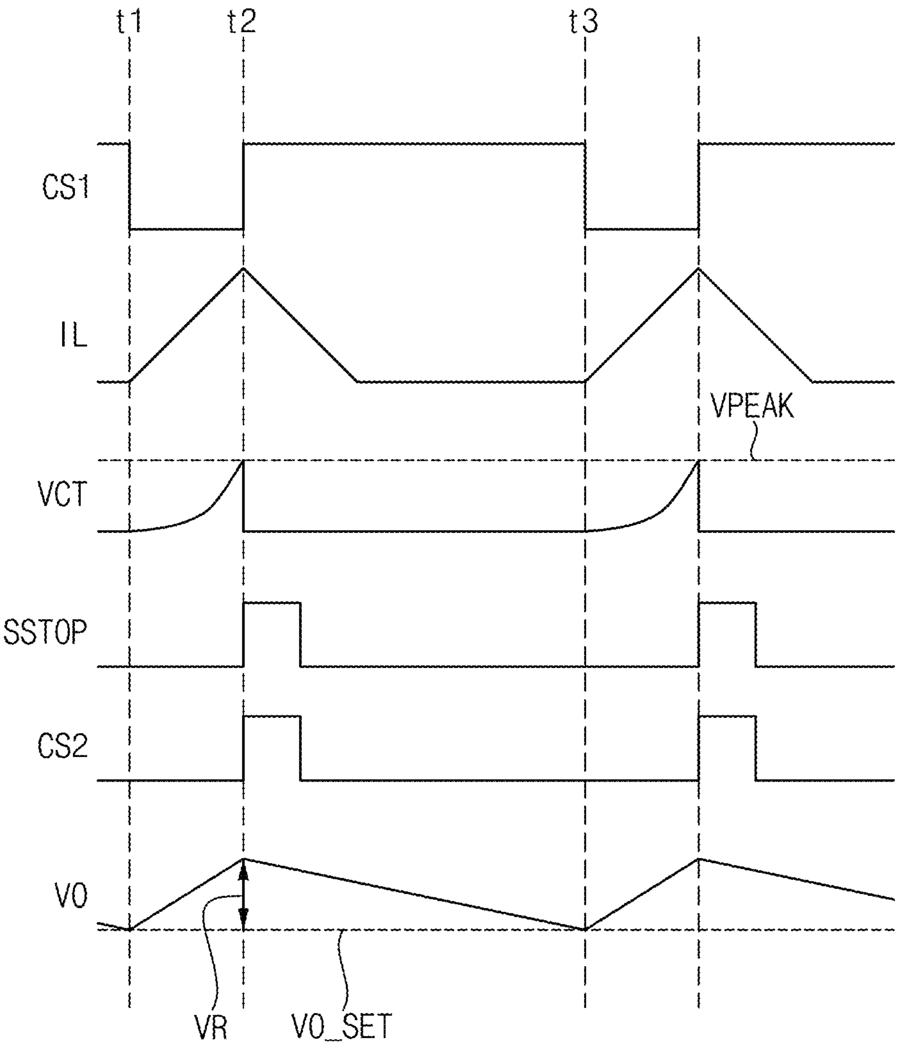
FIG. 3 is a timing diagram illustrating an example in which a power voltage generator of the display device of FIG. 1 operates.
Figure 4:
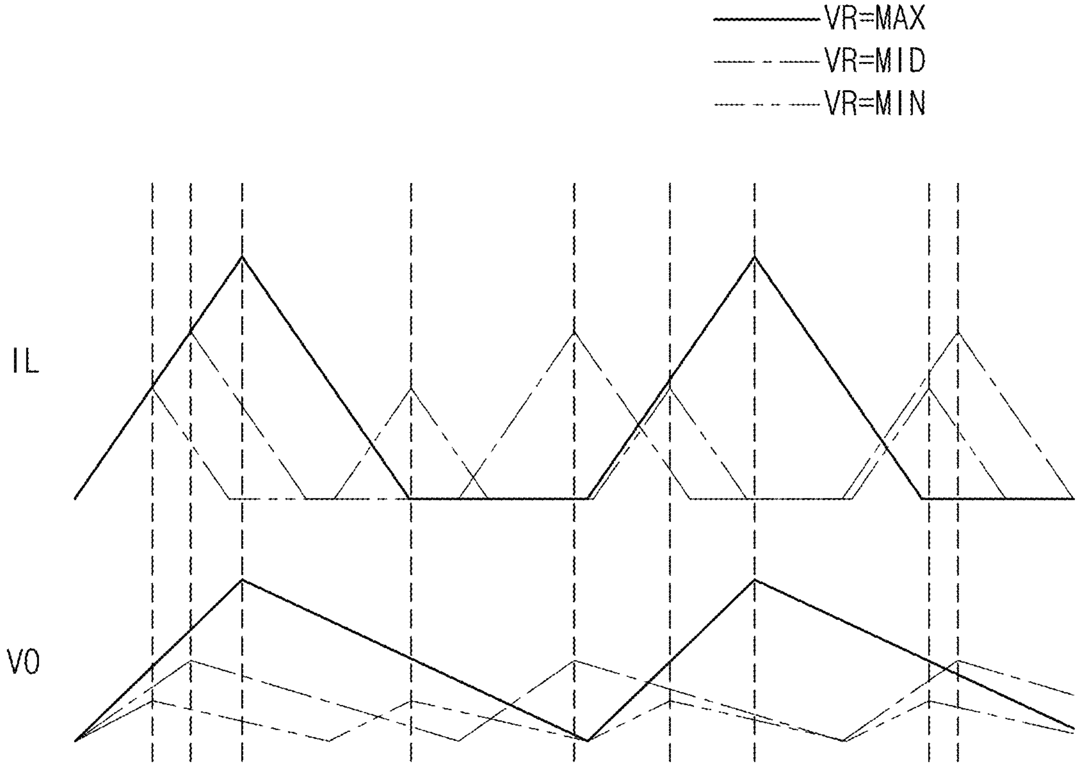
FIG. 4 is a diagram illustrating an example of an inductor current and an output voltage of the display device of FIG. 1.

FIG. 2 is a circuit diagram illustrating an example of the power voltage generator 500 of the display device of FIG. 1, FIG. 3 is a timing diagram illustrating an example in which the power voltage generator 500 of the display device of FIG. 1 operates, and FIG. 4 is a diagram illustrating an example of an inductor current IL and an output voltage VO of the display device of FIG. 1.

Referring to FIGS. 1 to 3, the power voltage generator 500 may include an input voltage providing part 510 for outputting an input voltage VIN in response to a first switch control signal CS1, an inductor L for receiving the input voltage VIN to generate the inductor current IL and connected to an outputting part 520, the outputting part 520 for generating an output voltage VO based on the inductor current IL and for generating a feedback voltage FB corresponding to the output voltage VO, an output sensing part 530 for sensing the output voltage VO in response to a second switch control signal CS2 and for generating an output sensing voltage VCT, a peak voltage generator 540 for generating a peak voltage VPEAK based on the input voltage VIN, set data SET_DATA corresponding to an output set voltage VO_SET, and the ripple data VR_DATA corresponding to the ripple set voltage VR, a first comparing part 550 for generating a stop signal SSTOP based on the output sensing voltage VCT and the peak voltage VPEAK, a second comparing part 560 for generating a start signal SSTART based on the set data SET_DATA and the feedback voltage FB, and a switch controller 570 for generating the first switch control signal CS1 and the second switch control signal CS2 based on the start signal SSTART and the stop signal SSTOP.

The switch controller 570 may generate a third switch control signal CS3 controlling an operation of the peak voltage generator 540. The peak voltage generator 540 may generate the peak voltage VPEAK based on the third switch control signal CS3.

The output voltage VO may be one of the power voltage ELVDD, the gate driving voltages VON and VOFF, the first driving voltage VDD1, and the second driving voltage VDD2.

The input voltage providing part 510 may include a first transistor T1 including a control electrode for receiving the first switch control signal CS1, a first electrode for receiving the input voltage VIN, and a second electrode connected to a first node N1, and a second transistor T2 including a control electrode for receiving the first switch control signal CS1, a first electrode connected to the first node N1, and a second electrode connected to a ground GND. The first node N1 may be connected to a first electrode of the inductor L.

In an embodiment, the first transistor T1 may be a different type from the second transistor T2. For example, as shown in FIG. 2, the first transistor T1 may be implemented as a p-channel metal oxide semiconductor ("PMOS") transistor, and the second transistor T2 may be implemented as an n-channel metal oxide semiconductor ("NMOS") transistor.

The input voltage VIN may be a voltage externally applied to the display device. The power voltage generator 500 may generate the output voltage VO based on the input voltage VIN.

The outputting part 520 may include a first capacitor C1 including a first electrode connected to a second node N2 and a second electrode connected to the ground GND, a first resistance element R1 including a first electrode connected to the second node N2 and a second electrode for outputting the feedback voltage FB, and a second resistance element R2 including a first electrode connected to the second electrode of the first resistance element R1 and a second electrode connected to the ground GND. The second node N2 may be connected to a second electrode of the inductor L, and the output voltage VO may be a voltage of the second node N2.

The output sensing part 530 may include a third transistor T3 including a control electrode for receiving the second switch control signal CS2, a first electrode connected to the second node N2 connected to a second electrode of the inductor L, and a second electrode connected to a third node N3, a fourth transistor T4 including a control electrode for receiving the second switch control signal CS2, a first electrode connected to the third node N3, and a second electrode connected to the ground GND; and a second capacitor C2 including a first electrode connected to the third node N3 and a second electrode connected to the ground GND.

In an embodiment, the third transistor T3 may be a different type from the fourth transistor T4. For example, as shown in FIG. 2, the third transistor T3 may be implemented as the PMOS transistor, and the fourth transistor T4 may be implemented as the NMOS transistor.

The first comparing part 550 may include a comparator COMP1 including a first input terminal connected to the third node N3, a second input terminal for receiving the peak voltage VPEAK, and an output terminal for outputting the stop signal SSTOP.

The second comparing part 560 may include an analog-to-digital converter DAC for converting the set data SET_DATA into an analog form, and a second comparator COMP2 including a first input terminal for receiving the set data SET_DATA converted to the analog form, a second input terminal for receiving the feedback voltage FB, and an output terminal for outputting the start signal SSTART. For example, the analog-to-digital converter DAC may receive a reference voltage VREF and convert the set data SET_DATA into the analog form.

At a first time point t1, the second comparing part 560 may convert the set data SET DATA into the analog form, and output the start signal SSTART having an activation level to the switch controller 570 when the feedback voltage FB is smaller than the set data SET DATA converted into the analog form. The switch controller 570 may convert the first switch control signal CS1 to the activation level when the switch controller 570 receives the start signal SSTART having the activation level. When the input voltage providing part 510 receives the first switch control signal CS1 having the activation level, the input voltage providing part 510 may output the input voltage VIN to the inductor L. Accordingly, the inductor current IL and the output voltage VO may increase. In this time, the second switch control signal CS2 may have the activation level. Accordingly, the output sensing voltage VCT may also rise.

The second comparator COMP2 may compare the output set voltage VO_SET and the output voltage VO through the set data SET_DATA converted into the analog form and the feedback voltage FB. For example, the feedback voltage FB may be a voltage obtained by dividing the output voltage VO according to a ratio of the first resistor R1 and the second resistor R2 (i.e., ratio of the second resistor R2 to the sum of the first resistor R1 and the second resistor R2). For example, the set data SET_DATA may be data corresponding to a voltage obtained by dividing the output set voltage VO_SET according to the ratio of the first resistor R1 and the second resistor R2. Accordingly, when the output voltage VO becomes the output set voltage VO_SET, the input voltage providing part 510 may output the input voltage VIN to increase the output voltage VO.

An activation level of the first switch control signal CS1 may be a voltage level at which the input voltage providing part 510 outputs the input voltage VIN. For example, as shown in FIG. 3, the activation level of the first switch control signal CS1 may be a low voltage level.

An activation level of the second switch control signal CS2 may be a voltage level for the output sensing part 530 to sense the output voltage VO. For example, as shown in FIG. 3, the activation level of the second switch control signal CS2 may be a low voltage level.

At a second time point t2, the first comparing part 550 may output the stop signal SSTOP having the activation level to the switch controller 570 when the output sensing voltage VCT reaches the peak voltage VPEAK. When the switch controller 570 receives the stop signal SSTOP having the activation level, the switch controller 570 may convert the first switch control signal CS1 and the second switch control signal CS2 from the activation level to an inactivation level. The input voltage providing part 510 may not output the input voltage VIN to the inductor L when the input voltage providing part 510 receives the first switch control signal CS1 having the inactivation level. Accordingly, the inductor current IL and the output voltage VO may decrease. In this time, the second switch control signal CS2 may have the inactivation level. Accordingly, the output sensing voltage VCT may also decrease. For example, as shown in FIG. 3, the activation level of the stop signal SSTOP may be a high voltage level.

The first comparator COMP1 may compare the output sensing voltage VCT and the peak voltage VPEAK. Therefore, when the output sensing voltage VCT reaches the peak voltage VPEAK, the input voltage providing part 510 does not output the input voltage VIN, so the output voltage VO may be reduced. Also, when the output sensing voltage VCT reaches the peak voltage VPEAK, the output sensing part 530 may discharge the second capacitor C2 to decrease the output sensing voltage VCT.

The peak voltage VPEAK may be determined based on the input voltage VIN, the set data SET_DATA, and the ripple data VR_DATA. For example, the peak voltage VPEAK may increase as the output set voltage VO_SET increases, increase as the ripple set voltage VR increases, and decrease as the input voltage VIN increases. For example, the peak voltage VPEAK may increase as a capacitance of the first capacitor C1 increases, and decrease as a capacitance of the second capacitor C2 increases. For example, the peak voltage VPEAK may be calculated using [Equation], $$VPEAK = \frac{C1 \times VR}{K \times C2} \times \frac{\text{VO\_SET}}{VIN}, \qquad \text{[Equation]}$$

where VPEAK is the peak voltage, C1 is the capacitance of the first capacitor, VR is the ripple set voltage, K is a peak calculation constant, C2 is the capacitance of the second capacitor, VO_SET is the output set voltage, and VIN is the input voltage.

For example, when the output sensing voltage VCT is the peak voltage VPEAK, the output voltage VO may be a sum of the output set voltage VO_SET and the ripple set voltage VR. For example, the output voltage VO may be greater than or equal to the output set voltage VO_SET and less than or equal to the sum of the output set voltage VO_SET and the ripple set voltage VR.

At a third time point t3, the second comparing part 560 may convert the set data SET DATA into the analog form, and output the start signal SSTART having an activation level to the switch controller 570 when the feedback voltage FB is smaller than the set data SET DATA converted into the analog form. The switch controller 570 may convert the first switch control signal CS1 to the activation level when the switch controller 570 receives the start signal SSTART having the activation level. When the input voltage providing part 510 receives the first switch control signal CS1 having the activation level, the input voltage providing part 510 may output the input voltage VIN to the inductor L. Accordingly, the inductor current IL and the output voltage VO may increase. In this time, the second switch control signal CS2 may have the activation level. Accordingly, the output sensing voltage VCT may also rise.

Referring to FIGS. 2 and 4, FIG. 4 shows the output voltage VO and the inductor current IL according to the ripple set voltage VR when the output set voltage VO_SET is the same. A switching frequency of the output voltage VO may decrease as the ripple set voltage VR increases.

For example, when the ripple set voltage VR is maximum (i.e., VR=MAX), the switching frequency of the output voltage VO may be the smallest. For example, when the ripple set voltage VR is minimum (i.e., VR=MIN), the switching frequency of the output voltage VO may be the highest. For example, when the ripple set voltage VR is medium (i.e., VR=MID), the switching frequency of the output voltage VO may be greater than when the ripple set voltage VR is the maximum, and may be smaller than when the ripple set voltage VR is the minimum.

As the switching frequency of the output voltage VO is reduced, switching loss may be reduced. Therefore, the display device may reduce the switching loss by increasing the ripple set voltage VR.

FIG. 5 is a table illustrating an example of the ripple data VR_DATA of the display device of FIG. 1.

Referring to FIGS. 1 and 5, the timing controller 200 may generate the ripple data VR_DATA corresponding to the ripple set voltage VR and output the ripple data VR_DATA to the power voltage generator 500. For example, the timing controller 200 may output the ripple data VR_DATA to the power voltage generator 500 through the inter-integrated circuit (I2C) communication or the single wire (SWIRE) communication.

For example, the ripple data VR_DATA corresponding to the ripple set voltage VR of 2 millivolts (mV) may be 1. For example, the ripple data VR_DATA corresponding to the ripple set voltage VR of 4 mV may be 2.

FIG. 6 is a table illustrating an example of the ripple set voltage VR for the power voltage ELVDD of the display device of FIG. 1.

Referring to FIGS. 1 and 6, the ripple set voltage VR may vary according to a model of the display panel 100. The display panel 100 may include different panel materials forming the display panel 100 depending on the model. Accordingly, the display panel 100 may have different ripple set voltages VR at which flicker is recognized depending on the model.

For example, a first model MODEL1 may include material A, a second model MODEL2 may include material B, and a third model MODEL3 may include material C. The ripple set voltage VR at which the flicker of the first model (MODEL1) is recognized may be 20 mV, the ripple set voltage VR at which the flicker of the second model MODEL2 is recognized may be 30 mV, and the ripple set voltage VR at which the flicker of the third model MODEL3 is recognized may be 40 mV. In a case of the first model MODEL1, the timing controller 200 may provide the ripple data VR_DATA for the power voltage ELVDD corresponding to the ripple set voltage VR of 10 mV to the power voltage generator 500. In a case of the second model MODEL2, the timing controller 200 may provide the ripple data VR_DATA for the power voltage ELVDD corresponding to the ripple set voltage VR of 14 mV to the power voltage generator 500. In a case of the third model MODEL3, the timing controller 200 may provide the ripple data VR_DATA for the power voltage ELVDD corresponding to the ripple set voltage VR of 20 mV to the power voltage generator 500. Here, the ripple set voltage VR at which the flicker is recognized may be experimentally measured.

In this way, the display device may reduce the switching loss according to the model by increasing the ripple set voltage VR as the rippled set voltage VR at which the flicker is recognized increases.

Figure 8:
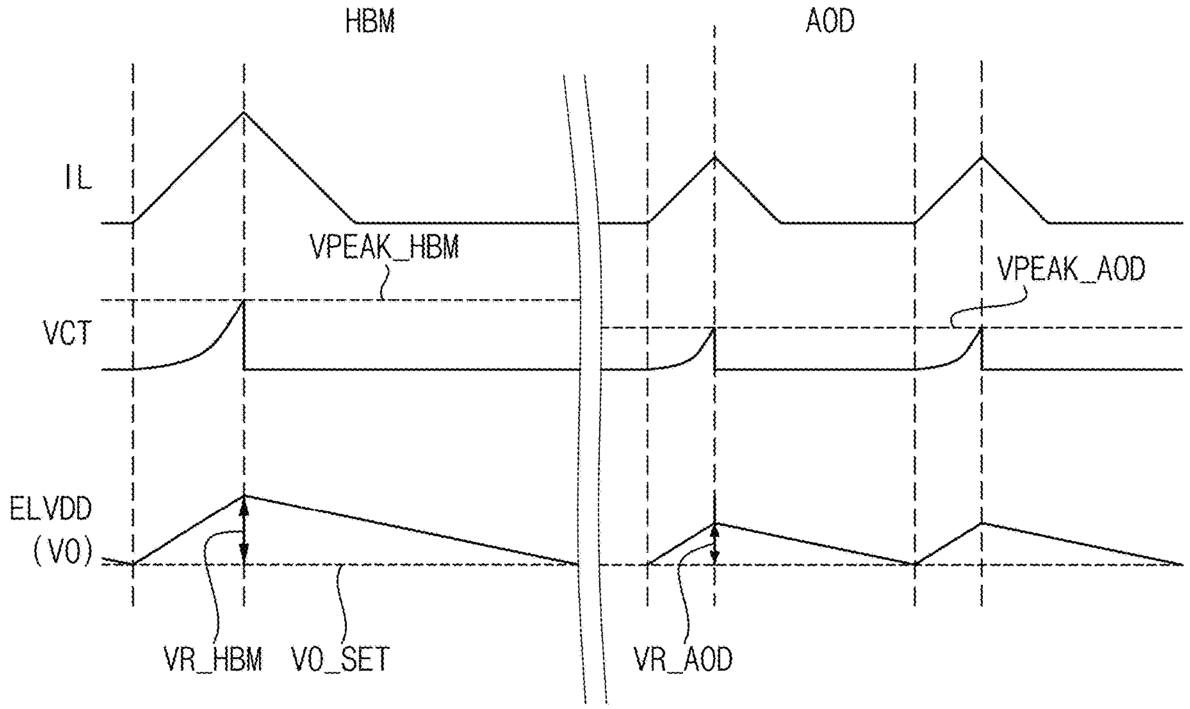
FIG. 8 is a diagram illustrating an inductor current, an output sensing voltage, and an output voltage according to a driving mode of the display device of FIG. 7.

FIG. 7 is a table illustrating an example of the ripple set voltage VR for the power voltage ELVDD of a display device according to embodiments of the present invention, and FIG. 8 is a diagram illustrating the inductor current IL, the output sensing voltage VCT, and the output voltage VO according to a driving mode of the display device of FIG. 7.

The display device according to the present embodiment is substantially the same as the display device of FIG. 1 except for determining the ripple set voltage VR according to the driving mode. Thus, the same reference numerals are used to refer to the same or similar element, and any repetitive explanation will be omitted.

Referring to FIGS. 1 and 7, the ripple set voltage VR in a low power mode AOD may be smaller than the ripple set voltage VR in a high power mode HBM. The ripple set voltage VR in a normal mode NORMAL may be greater than the ripple set voltage VR in the low power mode AOD. The ripple set voltage VR in the normal mode NORMAL may be smaller than the ripple set voltage VR in the high power mode HBM. That is, the switching frequency of the high power mode HBM may be smaller than the switching frequency of the low power mode AOD.

The low power mode AOD may operate with lower luminance than the normal mode NORMAL. For example, the high power mode HBM may operate with higher luminance than the normal mode NORMAL.

The flicker may be more visually recognized in the low power mode AOD than in the high power mode HBM. That is, for the same ripple voltage, the flicker may be recognized better in the low power mode AOD than in the high power mode HBM. Therefore, the flicker in the low power mode AOD may be minimized by lowering the ripple voltage of the power voltage ELVDD in the low power mode AOD than the ripple voltage of the power voltage ELVDD in the high power mode HBM.

The greater the ripple set voltage VR, the better the flicker may be recognized (i.e., the greater the ripple set voltage VR, the greater the ripple voltage). Therefore, in order to secure visibility while reducing the switching loss, a relatively larger ripple set voltage VR may be used in high power mode HBM and a relatively smaller ripple set voltage VR may be used in low power mode AOD.

Referring to FIG. 8, the peak set voltage VR_HBM of the high power mode HBM for the power voltage ELVDD may be greater than the peak set voltage VR_AOD of the low power mode AOD for the power voltage ELVDD. Accordingly, the peak voltage VPEAK_HBM of the high power mode HBM for the power voltage ELVDD may be greater than the peak voltage VPEAK_AOD of the low power mode AOD for the power voltage ELVDD.

Figure 9:
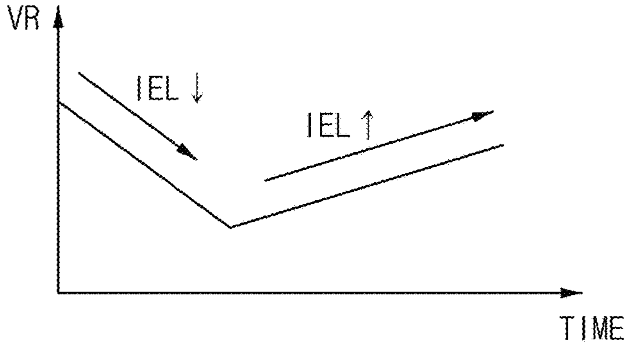
FIG. 9 is a graph illustrating an example of a ripple set voltage for a power voltage of a display device according to embodiments of the present invention.

FIG. 9 is a graph illustrating an example of the ripple set voltage VR for the power voltage ELVDD of a display device according to embodiments of the present invention.

The display device according to the present embodiment is substantially the same as the display device of FIG. 1 except for determining the ripple set voltage VR according to a power current IEL. Thus, the same reference numerals are used to refer to the same or similar element, and any repetitive explanation will be omitted.

Referring to FIGS. 1 and 9, the power voltage generator 500 may apply the power voltage ELVDD to the display panel 100 through a power line and sense the power current IEL applied to the power line.

The pixels P may be driven (i.e., emit light) by the power voltage ELVDD, and the power current IEL when displaying a high-grayscale image may be greater than the power current IEL when displaying a low-grayscale image.

The flicker may be better recognized in the low-grayscale image than in the high-grayscale image. Also, as the ripple set voltage VR is larger, the flicker may be more easily recognized. Therefore, in order to secure visibility while reducing the switching loss, a relatively larger ripple set voltage VR may be used in the high-grayscale image and a relatively smaller ripple set voltage VR may be used in the low-grayscale image.

For example, as the sensed power current IEL decreases, the ripple set voltage VR for the power voltage ELVDD may decrease. For example, as the sensed power current IEL increases, the ripple set voltage VR for the power voltage ELVDD may increase.

FIG. 10 is a graph illustrating an example of the ripple set voltage VR for the first and second driving voltages VDD1 and VDD2 of a display device according to embodiments of the present invention.

Referring to FIGS. 1 and 10, the ripple set voltage VR may decreases as a resolution of the display panel 100 increases. As the resolution of the display panel 100 increases, current output from the timing controller 200 and the data driver 400 may increase. That is, as the resolution of the display panel 100 increases, a load of the timing controller 200 and the data driver 400 may increase.

When the load of the timing controller 200 and the data driver 400 increases, the ripple voltages of the first and second driving voltages VDD1 and VDD1 provided to the timing controller 200 and the data driver 400 may increase. Therefore, in order to compensate for the increased ripple voltage due to a high load, the display device may use a smaller ripple set voltage VR as the resolution increases.

For example, at a resolution of 2560×1440, the ripple set voltage VR for the first and second driving voltages VDD1 and VDD2 may be 10 mV. For example, at a resolution of 1920×1080, the ripple set voltage VR for the first and second driving voltages VDD1 and VDD2 may be 20 mV. For example, at a resolution of 1280×720, the ripple set voltage VR for the first and second driving voltages VDD1 and VDD2 may be 30 mV.

FIG. 11 is a graph illustrating an example of the ripple set voltage VR for the first and second driving voltages VDD1 and VDD2 of a display device according to embodiments of the present invention.

The display device according to the present embodiment is substantially the same as the display device of FIG. 1 except for determining the ripple set voltage VR according to a driving frequency of the display panel 100. Thus, the same reference numerals are used to refer to the same or similar element, and any repetitive explanation will be omitted.

Referring to FIGS. 1 and 11, the ripple set voltage VR may decrease as the driving frequency of the display panel 100 increases. As the driving frequency of the display panel 100 increases, current output from the timing controller 200 and the data driver 400 may increase. That is, as the driving frequency of the display panel 100 increases, the load of the timing controller 200 and the data driver 400 may increase.

When the load of the timing controller 200 and the data driver 400 increases, the ripple voltages of the first and second driving voltages VDD1 and VDD1 provided to the timing controller 200 and the data driver 400 may increase. Therefore, in order to compensate for the increased ripple voltage due to the high load, the display device may use a smaller ripple set voltage VR as the driving frequency increases.

For example, the ripple set voltage VR for the first and second driving voltages VDD1 and VDD2 at the driving frequency of 120 Hz may be 10 mV. For example, the ripple set voltage VR for the first and second driving voltages VDD1 and VDD2 at the driving frequency of 600 Hz may be 20 mV. For example, the ripple set voltage VR for the first and second driving voltages VDD1 and VDD2 at the driving frequency of 30 Hz may be 30 mV.

Figure 12:
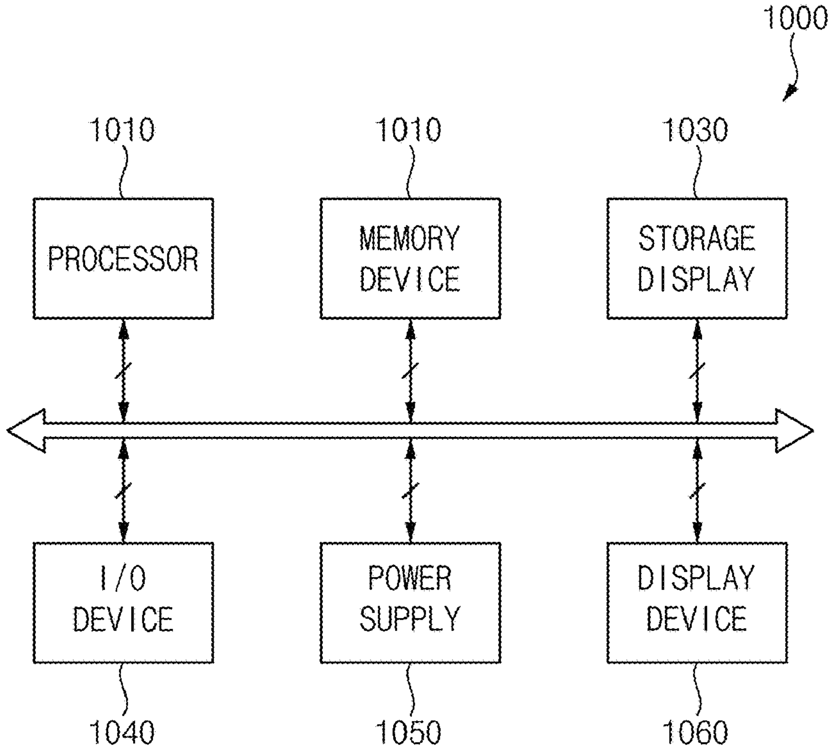
FIG. 12 is a block diagram showing an electronic device according to embodiments of the present invention.
Figure 13:
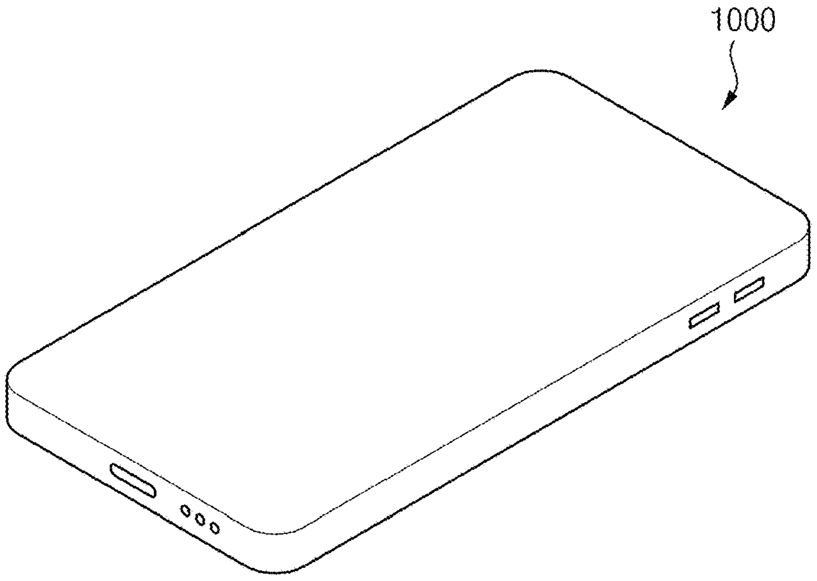
FIG. 13 is a diagram showing an example in which the electronic device of FIG. 12 is implemented as a smart phone.

FIG. 12 is a block diagram showing an electronic device according to embodiments of the present invention, and FIG. 13 is a diagram showing an example in which the electronic device of FIG. 12 is implemented as a smart phone.

Referring to FIGS. 12 and 13, the electronic device 1000 may include a processor 1010, a memory device 1020, a storage device 1030, an input/output ("I/O") device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus ("USB") device, other electronic devices, etc. In an embodiment, as shown in FIG. 13, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display ("HMD") device, etc.

The processor 1010 may perform various computing functions. The processor 1010 may be a microprocessor, a central processing unit ("CPU"), an application processor ("AP"), etc. The processor 1010 may be coupled to other components via an address bus, a control bus, a data bus, etc. Further, the processor 1010 may be coupled to an extended bus such as a peripheral component interconnection ("PCI") bus.

The memory device 1020 may store data for operations of the electronic device 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc. and/or at least one volatile memory device such as a dynamic random access memory ("DRAM") device, a static random access memory ("SRAM") device, a mobile DRAM device, etc.

The storage device 1030 may include a solid state drive ("SSD") device, a hard disk drive ("HDD") device, a CD-ROM device, etc.

The I/O device 1040 may include an input device such as a keyboard, a keypad, a mouse device, a touch pad, a touch screen, etc., and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit ("PMIC").

The display device 1060 may display an image corresponding to visual information of the electronic device 1000. For example, the display device 1060 may be an organic light emitting display device or a quantum dot light emitting display device, but is not limited thereto. The display device 1060 may be coupled to other components via the buses or other communication links in another embodiment. Here, the display device 1060 may decrease the switching frequency of the output voltage by increasing the ripple voltage of the output voltage of the power voltage generator. Accordingly, the display device may reduce the switching loss of the power voltage generator.

The inventions may be applied to any electronic device including the display device. For example, the inventions may be applied to a television ("TV"), a digital TV, a 3D TV, a mobile phone, a smart phone, a tablet computer, a virtual reality ("VR") device, a wearable electronic device, a personal computer ("PC"), a home appliance, a laptop computer, a personal digital assistant ("PDA"), a portable multimedia player ("PMP"), a digital camera, a music player, a portable game console, a navigation device, etc.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A power voltage generator comprising:
- an input voltage providing part configured to output an input voltage in response to a first switch control signal;
- an inductor configured to receive the input voltage to generate an inductor current and connected to an outputting part;
- the outputting part configured to generate an output voltage based on the inductor current and to generate a feedback voltage corresponding to the output voltage;
- an output sensing part configured to sense the output voltage in response to a second switch control signal and to generate an output sensing voltage;
- a peak voltage generator configured to generate a peak voltage in response to a third switch control signal;
- a first comparing part configured to generate a stop signal based on the output sensing voltage and the peak voltage;
- a second comparing part configured to generate a start signal based on set data corresponding to an output set voltage and the feedback voltage; and
- a switch controller configured to generate the first switch control signal and the second switch control signal based on the start signal and the stop signal and to generate the third switch control signal for controlling an operation of the peak voltage generator.

2. The power voltage generator of claim 1, wherein the peak voltage generator is configured to generate the peak voltage based on the input voltage, the set data, and ripple data corresponding to a ripple set voltage.

3. The power voltage generator of claim 2, wherein the input voltage providing part includes:
- a first transistor including a control electrode configured to receive the first switch control signal, a first electrode configured to receive the input voltage, and a second electrode connected to a first node, the first node being connected to a first electrode of the inductor; and
- a second transistor including a control electrode configured to receive the first switch control signal, a first electrode connected to the first node, and a second electrode connected to a ground, and
- wherein the first transistor is a different type from the second transistor.

4. The power voltage generator of claim 2, wherein the outputting part includes:
- a first capacitor including a first electrode connected to a second node and a second electrode connected to a ground, the second node being connected to a second electrode of the inductor;
- a first resistance element including a first electrode connected to the second node and a second electrode configured to output the feedback voltage; and
- a second resistance element including a first electrode connected to the second electrode of the first resistance element and a second electrode connected to the ground, and
- wherein the output voltage is a voltage of the second node.

5. The power voltage generator of claim 2, wherein the output sensing part includes:
- a third transistor including a control electrode configured to receive the second switch control signal, a first electrode connected to a second node, and a second electrode connected to a third node, the second node being the connected to a second electrode of the inductor;
- a fourth transistor including a control electrode configured to receive the second switch control signal, a first electrode connected to the third node, and a second electrode connected to a ground; and
- a second capacitor including a first electrode connected to the third node and a second electrode connected to the ground, and
- wherein the third transistor is a different type from the fourth transistor.

6. The power voltage generator of claim 5, wherein the first comparing part includes:
- a comparator including a first input terminal connected to the third node, a second input terminal configured to receive the peak voltage, and an output terminal configured to output the stop signal.

7. The power voltage generator of claim 2, wherein the second comparing part includes:
- an analog-to-digital converter configured to convert the set data into an analog form; and
- a second comparator including a first input terminal configured to receive the set data converted to the analog form, a second input terminal configured to receive the feedback voltage, and an output terminal configured to output the start signal.

8. The power voltage generator of claim 2, wherein the peak voltage increases as the output set voltage increases, increases as the ripple set voltage increases, and decreases as the input voltage increases.

9. The power voltage generator of claim 2, wherein the outputting part includes:
- a first capacitor including a first electrode connected to a second node and a second electrode connected to a ground, the second node being connected to a second electrode of the inductor;
- a first resistance element including a first electrode connected to the second node and a second electrode configured to output the feedback voltage; and
- a second resistance element including a first electrode connected to the second electrode of the first resistance element and a second electrode connected to the ground,
- wherein the output sensing part includes:
- a third transistor including a control electrode configured to receive the second switch control signal, a first electrode connected to the second node, and a second electrode connected to a third node;

a fourth transistor including a control electrode configured to receive the second switch control signal, a first electrode connected to the third node, and a second electrode connected to the ground; and a second capacitor including a first electrode connected to the third node and a second electrode connected to the ground, and wherein the peak voltage increases as a capacitance of the first capacitor increases, and decreases as a capacitance of the second capacitor increases.

10. The power voltage generator of claim 2, wherein the first comparing part is configured to output the stop signal having an activation level to the switch controller when the output sensing voltage reaches the peak voltage, and wherein the switch controller is configured to convert the first switch control signal and the second switch control signal from the activation level to an inactivation level when the switch controller receives the stop signal having the activation level.

11. The power voltage generator of claim 2, wherein the second comparing part is configured to convert the set data into an analog form, and to output the start signal having an activation level to the switch controller when the feedback voltage is smaller than the set data converted into the analog form, and wherein the switch controller is configured to convert the first switch control signal to the activation level when the switch controller receives the start signal having the activation level.

12. The power voltage generator of claim 2, wherein the output voltage is greater than or equal to the output set voltage and less than or equal to a sum of the output set voltage and the ripple set voltage.

13. The power voltage generator of claim 2, wherein a switching frequency of the output voltage decreases as the ripple set voltage increases.

14. A display device comprising:

a display panel including pixels;

a gate driver configured to provide gate voltages to the pixels;

a data driver configured to provide data voltages to the pixels;

a timing controller configured to control the gate driver and the data driver; and a power voltage generator configured to provide a power voltage for driving the pixels to the display panel, wherein the power voltage generator includes:

an input voltage providing part configured to output an input voltage in response to a first switch control signal;

an inductor configured to receive the input voltage to generate an inductor current and connected to an outputting part;

the outputting part configured to generate the power voltage based on the inductor current and to generate a feedback voltage corresponding to the power voltage;

an output sensing part configured to sense the power voltage in response to a second switch control signal and to generate an output sensing voltage;

a peak voltage generator configured to generate a peak voltage in response to a third switch control signal;

a first comparing part configured to generate a stop signal based on the output sensing voltage and the peak voltage;

a second comparing part configured to generate a start signal based on set data corresponding to an output set voltage and the feedback voltage; and a switch controller configured to generate the first switch control signal and the second switch control signal based on the start signal and the stop signal and to generate the third switch control signal for controlling an operation of the peak voltage generator.

15. The display device of claim 14, wherein the peak voltage generator is configured to generate the peak voltage based on the input voltage, the set data, and ripple data corresponding to a ripple set voltage.

16. The display device of claim 14, wherein the ripple set voltage in a low power mode is smaller than the ripple set voltage in a high power mode.

17. A display device comprising:

a display panel including pixels;

a gate driver configured to provide gate voltages to the pixels;

a data driver configured to provide data voltages to the pixels;

a timing controller configured to control the gate driver and the data driver; and a power voltage generator configured to provide a driving voltage for driving the data driver to the data driver, wherein the power voltage generator includes:

an input voltage providing part configured to output an input voltage in response to a first switch control signal;

an inductor configured to receive the input voltage to generate an inductor current and connected to an outputting part;

the outputting part configured to generate the driving voltage based on the inductor current and to generate a feedback voltage corresponding to the driving voltage;

an output sensing part configured to sense the driving voltage in response to a second switch control signal and to generate an output sensing voltage;

a peak voltage generator configured to generate a peak voltage in response to a third switch control signal;

a first comparing part configured to generate a stop signal based on the output sensing voltage and the peak voltage;

a second comparing part configured to generate a start signal based on set data corresponding to an output set voltage and the feedback voltage; and a switch controller configured to generate the first switch control signal and the second switch control signal based on the start signal and the stop signal and to generate the third switch control signal for controlling an operation of the peak voltage generator.

18. The display device of claim 17, wherein the peak voltage generator is configured to generate the peak voltage based on the input voltage, the set data, and ripple data corresponding to a ripple set voltage.

19. The display device of claim 17, wherein the ripple set voltage decreases as a resolution of the display panel increases.

20. The display device of claim 17, wherein the ripple set voltage decreases as a driving frequency of the display panel increases.

* * * * *